(12) United States Patent  (10) Patent No.: US 8,363,273 B2
Morovic et al.  (45) Date of Patent: Jan. 29, 2013

(54) PRINTING SYSTEM

(75) Inventors: Jan Morovic, Colchester (GB); Peter Morovic, Barcelona (ES); Jordi Arnabat Benedicto, Tarragona (ES); Johan Lammens, Barcelona (ES); Michel Georges Encrenaz, Rubi (ES); Juan Uroz, Terrassa (ES); Jordi Vilar, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 12/605,433

(22) Filed: Oct. 26, 2009

(65) Prior Publication Data

US 2011/0096344 A1  Apr. 28, 2011

(51) Int. Cl.
*G06F 15/00* (2006.01)
(52) U.S. Cl. .................. 358/1.9; 358/3.26; 358/1.15
(58) Field of Classification Search ............ 358/1.9, 358/3.26, 1.15
See application file for complete search history.

(56) References Cited

U.S. PATENT DOCUMENTS

| | | | |
|---|---|---|---|
| 5,416,890 A | 5/1995 | Beretta | |
| 5,450,216 A | 9/1995 | Kasson | |
| H1506 H | 12/1995 | Beretta | |
| 5,553,199 A | 9/1996 | Spaulding et al. | |
| 5,583,666 A | 12/1996 | Ellson et al. | |
| 5,809,213 A | 9/1998 | Bhattacharjya | |
| 6,229,626 B1 | 5/2001 | Boll | |
| 6,381,361 B1 | 4/2002 | Silverbrook et al. | |
| 6,459,425 B1 | 10/2002 | Holub et al. | |
| 6,480,299 B1 | 11/2002 | Drakopoulos et al. | |
| 6,654,143 B1 * | 11/2003 | Dalal et al. | 358/1.9 |
| 6,724,500 B1 | 4/2004 | Hains et al. | |
| 6,972,869 B2 | 12/2005 | Harrington | |
| 7,075,643 B2 | 7/2006 | Holub | |
| 7,177,465 B1 | 2/2007 | Takahira | |
| 7,233,413 B2 | 6/2007 | Jones et al. | |
| 7,411,701 B2 | 8/2008 | Boll | |
| 7,421,117 B2 | 9/2008 | Kondo et al. | |
| 2008/0030787 A1 * | 2/2008 | McElvain | 358/3.26 |
| 2008/0294363 A1 * | 11/2008 | Parmar et al. | 702/95 |
| 2010/0214576 A1 * | 8/2010 | Morovic et al. | 358/1.9 |

OTHER PUBLICATIONS

U.S. Appl. No. 12/390,214.
C. Bradford Barber, David P. Dobkin and Hannu Huhdanpaa: The Quickhull Algorithm for Convex Hulls: ACM Transactions on Mathematical Software; Dec. 1996: pp. 1-15: vol. 22 No.
K. Schittkowski; NLPQL: A Fortran Subroutine Solving Constrained Nonlinear Programming Problems: Annals of Operations Research; 1985/6; pp, 485-500: No. 5: J. C. Baltzer A.G.

* cited by examiner

*Primary Examiner* — Twyler Haskins
*Assistant Examiner* — Michael Burleson

(57) ABSTRACT

Method of computing a convex hull in a predetermined color space, comprising determining a print attribute value range pertaining to a reference print attribute value, selecting base NP (Neugebauer Primary) area coverages, comprising area coverages of single NPs and combined NPs, having print attribute values in the print attribute value range, printing and measuring patches corresponding to the base NP area coverages, computing linear combinations of the base NP area coverages, and assigning one of the base NP area coverage or the linear combination of base NP area coverages to the corresponding color, depending on which is closest to the reference print attribute value.

17 Claims, 4 Drawing Sheets

PRINTING SYSTEM

BACKGROUND OF THE INVENTION

To accurately reproduce a desired target color using a printing system, an operator must perform repeated color adjustments by trial and error. In particular, the operator might adjust the color of an image on a video display in an attempt to obtain the desired target color on a color printer. After printing that first image using the color printer, the operator must perform a second color adjustment on the video display, wherein the adjustments are based on observations of the first printed image. This process would be repeated until the desired color print is output.

Such trial and error generally involves the process of color separation. In the past, color separation has traditionally been a matter of deciding what quantities of each of several inks (or other colorants) to use to achieve a given color. While this functionality was originally a photochemical process involving colored filters, it has evolved to its current state, which utilizes look-up tables comprising colorimetric input values or input values in a device color space. The output values for the tables may be n-dimensional ink vectors, where n is the number of inks used by the printer and the vector components represent quantities of each ink available on the color printer. In practice, the current approach utilizes these tables to transform ink amounts for each color plane, thereby reproducing the desired target color.

However, controlling print color by variation of ink amounts is a highly non-linear process, deriving from a complex relationship between changes in the quantity of each ink color used and the color of the resulting printed ink combination. As a result of this non-linearity, the gamut (the set of all printable colors) of a printing device may also include concavities. These concavities in some cases result in only relatively dull dark colors being printable. In addition, small changes in a system comprising non-linear relationships may also result in unacceptably large changes in output color. Therefore, non-linear relationships in a printing system may make it very challenging to obtain printing properties such as smooth transitions between colors, low cost per copy, high color constancy, and low grain.

In current systems, options are available for printing using lower amounts of ink. Present methods of using lower amounts of ink include using relatively more available black and/or dark inks and relatively less of a system's light inks. In one method more black is applied at the ICC (International Color Consortium) profile generation stage. Another way is to use a given ICC profile wherein the generated standard CMYK (Cyan Magenta Yellow Black) output is analyzed and some of the CMYK vectors are substituted by other vectors that use more black (K) ink and less ink overall. These methods oftentimes lead to an increase of grain, and/or change the color gamut.

In another method the available color gamut is reduced so as to reduce ink usage. Because ink usage may be relatively high near the outer borders of a color gamut, reducing the color gamut facilitates reduced ink usage. However, this method also reduces the availability of the colors near the outside borders of the gamut.

One of the objects of this disclosure is to find and use a system's optimum performance for particular print attributes, for example any halftone property such as low ink usage.

BRIEF DESCRIPTION OF THE DRAWINGS

For the purpose of illustration, certain embodiments of the present invention will now be described with reference to the accompanying diagrammatic drawings, in which.

DETAILED DESCRIPTION

Figure 1:
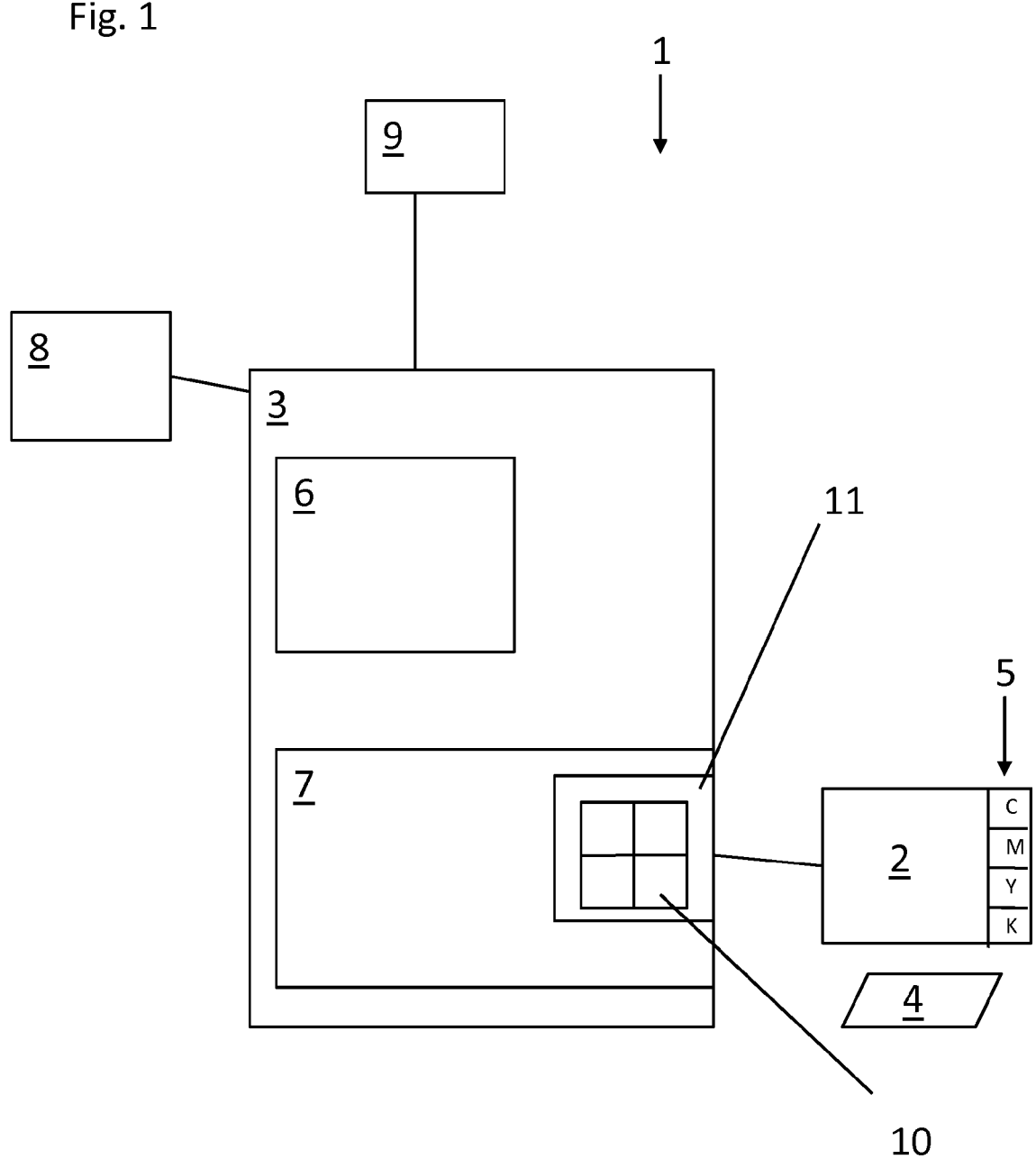
FIG. 1 shows a schematic diagram of a print system.

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed may be derived from the description and drawings.

This disclosure describes various exemplary methods and computer products for printing a document in a printing system. In particular, this disclosure describes selecting certain Neugebauer Primaries (NPs) and Neugebauer Primary area coverages (NPacs) to optimize a printing process according to a certain print attribute.

Use of NPs and NPacs is disclosed in U.S. patent application Ser. No. 12/390,214, filed 20 Feb. 2009, not yet published at filing the present application, the contents of which are included herein by reference.

In one embodiment, the Neugebauer Primaries are the possible combinations of a set of n inks. Each ink within the set may be at one of k levels for a single halftone pixel, where there are $k^n$ combinations for each ink set defining all of the possible ink configuration states that a single halftone pixel can have. For example, where k=2 for a binary (or bi-level) printer, the printer is able to use either no ink or one drop of ink at a single pixel per ink channel. For example, where n=2 the printer would have two ink channels, for example C and M. The possible combinations would then be White (W), C, M and CM, being $k^n=2^2=4$ possible combinations. For example, for a printer comprising six different inks and the ability to place either 0, 1, or 2 drops of each ink at each halftone pixel, resulting in $3^6$ or 729 NPs. A certain color may correspond to a certain NPac, which may be represented by a vector, wherein [W, C, M, CM]=[a(area)$_W$%, a$_C$%, a$_M$%, a$_{CM}$%], where a$_W$%+a$_C$%+a$_M$%+a$_{CM}$%=100%.

NPacs may be represented by linear, convex combinations of NPs, wherein the relative area coverages over a unit area are the convex weights. An NPac may also represent a single NP, that NP having a 100% area coverage weight and the other NPs being at 0%. According to an embodiment in this disclosure, all of a printing system's NPacs are accessible, so the full color gamut of a printing system can be addressed.

The present disclosure may relate to, as further described in U.S. patent application Ser. No. 12/390,214, printing and measuring up to all of an ink set's Neugebauer primaries (NPs), computing the convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages needed for each of the vertex NPs. The present disclosure may further relate to finding NPacs that are optimized according to a certain print attribute, wherein the print attribute may for example be a minimal ink usage, grain, color constancy, or another attribute. A convex hull of colors available on a system may be addressed, wherein the NPs are optimized for minimal ink usage.

FIG. 1 illustrates an exemplary printing system 1. The print system 1 may comprise a printer 2 of a predetermined type. Without intending to limit to a specific type of printer 2, the printer 2 may comprise a large or small format printer, a laser printer, an inkjet printer, an offset printer, a digital press, a dot-matrix printer, a line printer, and/or a solid ink printer.

The printing system 1 can be driven, at least in part, by one or more suitable computing devices 3. Computing devices 3 that may be used include, but are not limited to, a personal computer, a laptop computer, a desktop computer, a digital camera, a personal digital assistance device, a cellular phone, a video player, and other types of image sources.

The printer 2 may comprise a print head arranged to print on a substrate 4. The substrate 4 may comprise any type of substrate, for example, but not limited to, paper, films, foils, textiles, fabrics or plastics. The printer 2 may comprise, or be connected to, a certain ink set 5. The ink set 5 may comprise a predetermined number of inks, for example four inks which may be Cyan, Magenta, Yellow and Black (CMYK). The ink set 5 may be determined by the printer 2, wherein different printers 2 correspond to different ink sets 5, or different ink sets 5 may be applied in one printer 2.

The computing device 3 may be physically integrated with or connected to the printer 2. The computing device 3 may be arranged to process image data. The computing device 3 may be arranged to separate and/or convert colors. The computing device 3 may comprise a processing circuit 6 and a storage device 7. The storage device 7 may facilitate any type of computer data storage. The storage device 7 may comprise, but should not be limited to, any type non-volatile memory such as a hard disk, a solid state storage device, a ROM (Read Only Memory), an exchangeable data carrier, etc. The storage device 7 may store data, drivers, and computer programs, amongst others.

For example, an image for printing may be retrieved from the storage device 7, a remote storage location 8, such as an online application, using the Internet, and/or a local area network. Furthermore, a graphical user interface 9 may be provided for allowing an operator to change or interact with the print system 1.

This disclosure may relate to facilitating a color separation that is optimized for a certain print attribute. The print attribute may comprise minimum ink usage. A color separation table 10 may be provided, comprising NPacs optimized for minimal ink usage. The color separation table 10 may be stored in a print system driver, for example a printer driver 11. The storage device 7 may store the table 10. The table 10 may be stored in software running on the computing device 3, and/or on a remote storage location 8. In this description, a method and system of using such table 10 will be described, as well as a method and system of obtaining such table 10.

Certain features of the print system 1 may influence an outgoing image color for a given color input value, for example an input RGB value. For example, a specific ink set 5, and/or substrate 4 may influence the actual printed color. Therefore, the color separation table 10 may be calculated for specific print system 1, for example for specific printers 2, ink sets 5 and/or substrates 4.

The printing system 1 may employ an embodiment of a color separation interface and image processing system referred to as Halftone Area Neugebauer Separation (HANS), as described in U.S. patent application Ser. No. 12/390,214.

Figure 2:
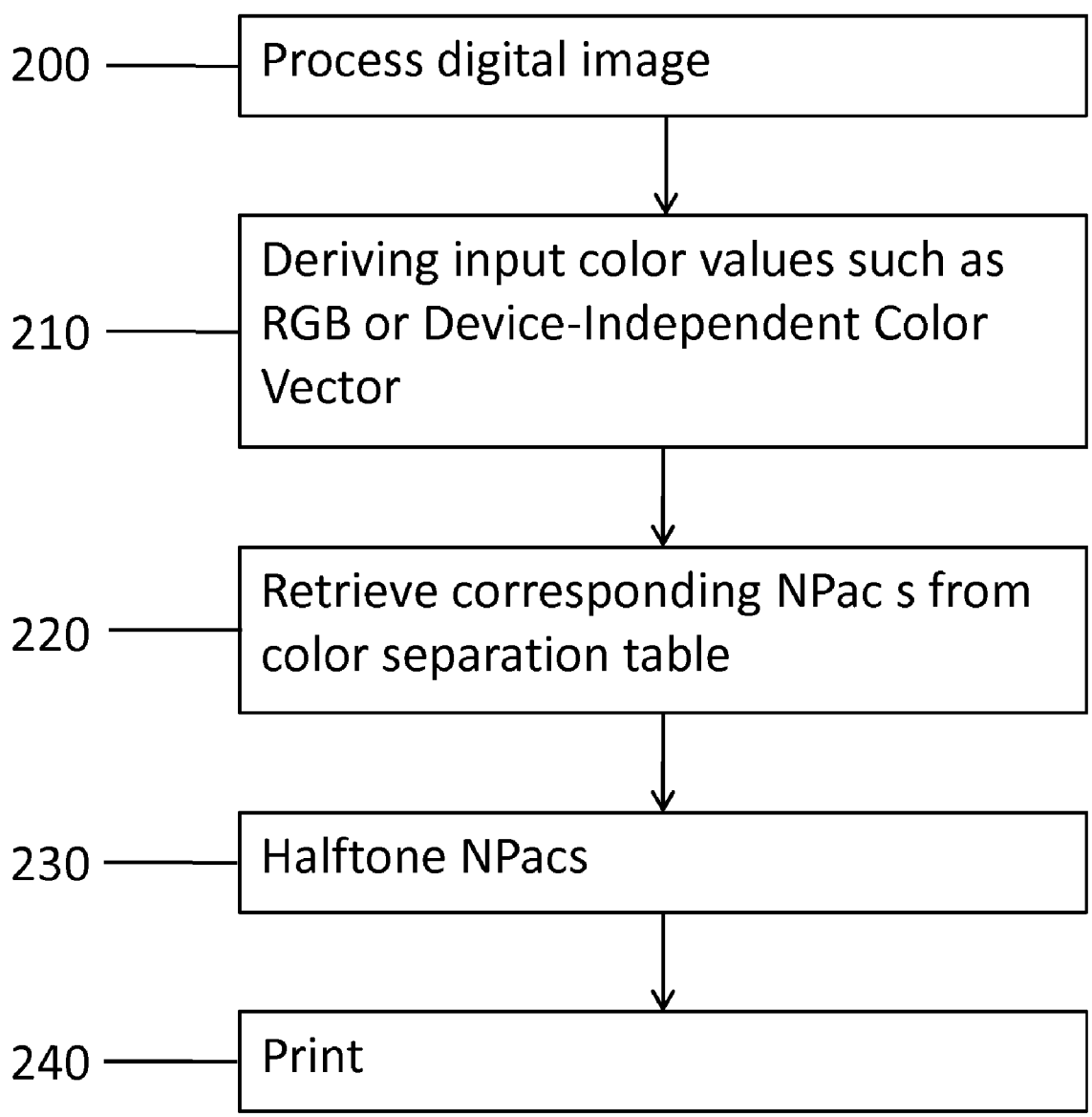
FIG. 2 shows a flow chart of a printing process using a color separation table.

FIG. 2 illustrates a color separation process and a halftoning process. In step 200, an image may be provided to the print system 1. For example the image may be received through a network or a data carrier. The image may be processed by the print system 1. For example, an input digital image may be transformed via its embedded ICC profile, and the printer's ICC profile, which may result in a continuous virtual device dependent RGB (Red, Green, and Blue) image or device independent CIE XYZ or CIE LAB values. Device independent values may be processed as input for step 220.

In an embodiment, in step 210, the device dependent RGB values may be received as an input. The received RGB image may be mapped to CIE XYZ so that the RGB cube bijects with the NPac's convex hull in the CIE XYZ color space.

In step 220, the system 1 may map each of the XYZs onto an NPac. The matching NPac may be retrieved from the color separation table 10. For example the table 10 may link NPacs to CIE XYZ values that are specific for the concerning print system 1, i.e. printer 2, ink set 5 and/or substrate 4.

The respective NPacs in the table 10 may be optimized for minimal ink usage. Instead of, or in addition to, minimal ink usage, the respective NPacs in the table may be optimized for other print attributes such as, but not limited to, color constancy and/or grain.

The retrieved NPacs may then be communicated to a halftoning process in step 230. Halftoning may be used to define a spatial arrangement of the NPs specified in the input NPac vectors. For example, Vector Error Diffusion or Device State Error Diffusion (DSED) may be applied as a halftoning technique, wherein the NPs are its states and the error is diffused in the NPac space. Halftoning is a well known process. Halftoning in relation to NPacs is described in U.S. patent application Ser. No. 12/390,214.

An NPac may specify a certain distribution of NPs by corresponding relative area coverages, for each unit area. However, each pixel may only have one corresponding NP. For instance, if the printer 2 attempts to have 50% of a cyan NP and 50% of a magenta NP at a single pixel and the halftoning chooses to use the magenta NP at that pixel, there will be 50% too little of the cyan NP and 50% too much of the magenta NP, and an error will therefore be the result. In DSED, the difference between the desired NPac and the NP placed may be distributed or diffused using known error diffusion methods to one or more neighboring pixels. Example error diffusion methods include, but are not limited to, error randomization, serpentine processing, and the like.

In step 240, the input image may be printed as a hard copy using optimized low ink usage, having the full available gamut available.

Figure 3:
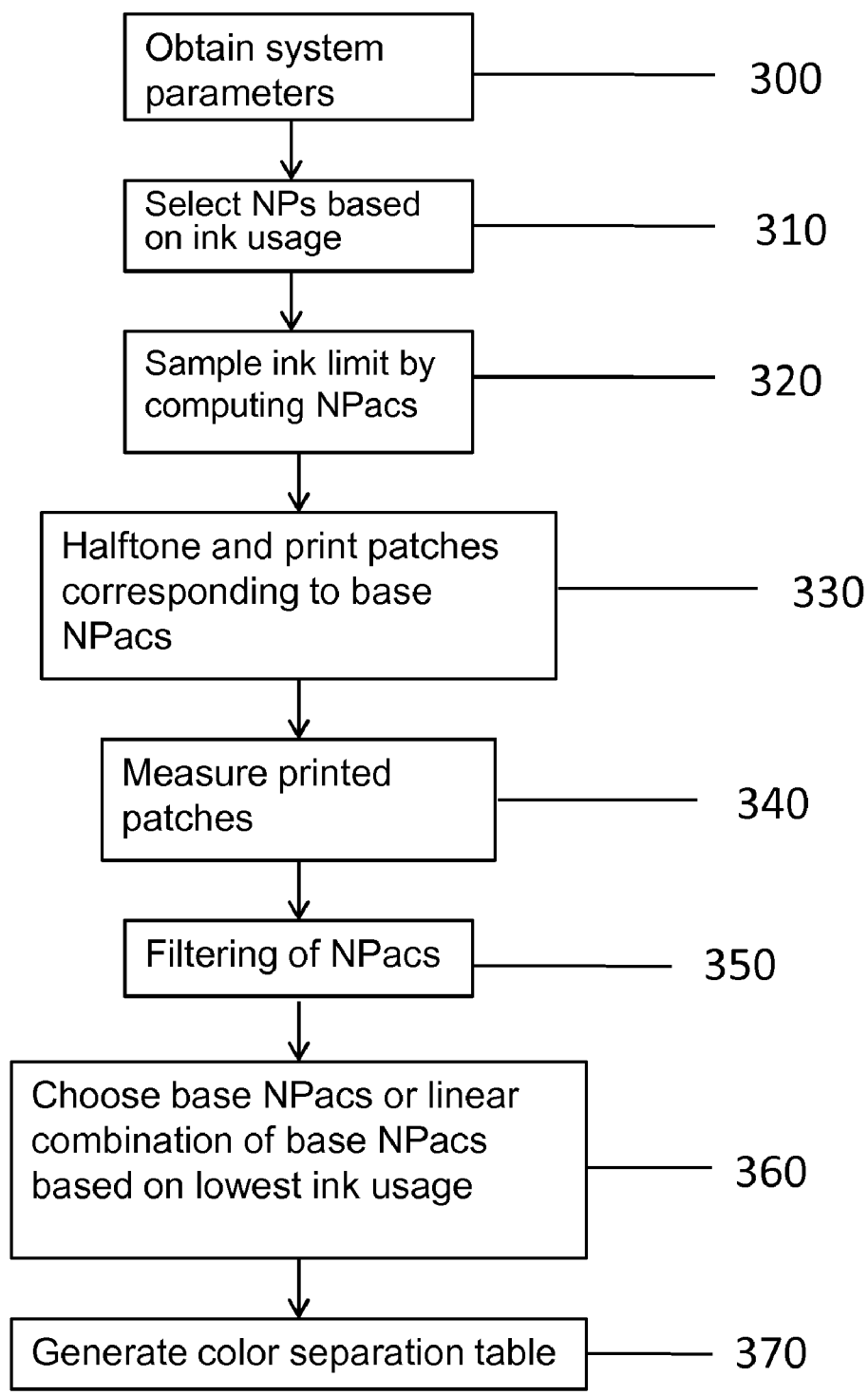
FIG. 3 shows a flow chart of a method of optimizing ink usage for a color.

In FIG. 3, a method is shown for obtaining a convex hull of NPacs in a predetermined color space. In the shown embodiment, the method outputs a table having optimized values for minimal ink usage for a predetermined print system 1.

In step 300, a number of system parameters may be obtained pertaining to a certain print system 1. The system parameters may include a number of inks (n), the weights of the inks per ink drop, the total ink limit per unit area, the maximum number of drops per ink per halftone pixel (k−1). Each of these parameters may depend on the type of ink set 5, substrate 4 and/or printer 2, or other hardware and/or software settings.

In a next step 310 a number of NPs may be selected based on ink usage. NPs may be selected that use no more, i.e. less than or the same as, a certain ink amount, for example based on the number of inks or ink drops per pixel or per surface area.

Among the initial k" NPs a number of NPs may be selected that use no more than a maximum number of inks. For example, NPs that use three inks or less may be selected. The applicable limit of number of inks may be determined experimentally. For example, the number of inks may be determined by carrying out all the steps as set out below with reference to FIGS. 3 and/or 4, without an initial ink amount limit, and determining which maximum number of NPs is left after carrying out all the steps. This number may then be used.

An advantage of using fewer inks is that the number of NPs may be limited. This may make the process more efficient because fewer calculations may be needed. Also using a relatively high number of inks may be inefficient since a combination of many inks may tend to be relatively dark, in which case it may be more efficient to use black (K) ink instead of multiple other inks.

In addition to or instead of limiting the number of inks, NPs may be selected that do not exceed a maximum number of ink drops per halftone pixel. This may be done after selecting NPs based on the number of different inks as mentioned above. For example, in an embodiment the number of drops per pixel may not exceed five or six drops, in a case wherein an ink limit of a specific print system and/or substrate is 3 drops.

At another step 320, the ink limit may be sampled. NPs that initially fell outside the ink range in one of above steps may be linearly combined with one or more selected NPs that initially fell within the range. This may involve computing an NPac that uses a maximum amount of ink, in other words, that is on the ink limit, and that is a linear combination of an NP that fell outside of the selection and one or more selected NPs. For example, the ink limit NPacs may be computed using quadratic programming for the mapping on the ink limit, and Delaunay tessellation for the conversion to NPac.

The NPs that were selected in step 310, the NPacs that were selected in step 320, and/or any other selected NP or NPac, may be referred to as 'base NPacs'. Note that single NPs can be interpreted as single NP NPacs.

In step 330, patches corresponding to the base NPacs, i.e. the selected NPs and NPacs, may be printed.

The printing process may comprise a halftoning process. The input for the patches may comprise base NPacs, whereas the patches may be printed by choosing a certain NP per pixel. The choice of which NP to use for each pixel may be determined by DSED (Device State Error Diffusion) halftoning, wherein the error due to the difference between the respective NP and the actual NPac is diffused in the NPac space. The halftoning may generate an n-channel halftone that can be passed through the printer pipeline. Next to the halftoning step, the resulting patches' colors may be determined by the respective printer 2, inks and/or substrate 4. The remaining stages that need to be taken before actual printing may be the same as currently applied, for example involving masking, amongst others.

In step 340, the printed patches may be measured, so as to be able to map the colors of the respective print system 1 with respect to corresponding NPacs.

Optionally a filtering step may be applied to the selected base NPacs, as indicated by step 350. Filtering may limit the number of base NPacs that can be combined in optimization step 360. This filtering step 350 may limit computing time. A method of filtering is described below with reference to FIG. 4.

In step 360, linear combinations of base NPacs may be computed, which base NPacs form vertices of polyhedra around corresponding single base NP area coverages, wherein the weighted linear combination of base NPacs and the corresponding single base NPac correspond to the same color. For the corresponding color, it may be determined which one of the base NPac and the linear combination of base NPacs uses the least ink. Then, the one using the least ink may be assigned to the respective color.

The preceding steps 300-360 may be repeated for multiple different print systems 1. For example, the steps 300-360 may be repeated for multiple different printers 2, multiple different ink sets 5, and/or multiple different substrates 4, and/or different combinations thereof. Between different print systems 1, a calculated base NPac (or linear combination of base NPacs) may be different for a predetermined color, because a different feature in the print system 1 may influence printed color properties. The vertex base NPacs in the linear combination each have a weight assigned to them, wherein the weights may be used as the area coverages of the resulting NPac.

In step 370, a color separation table may be generated, containing for each color an NPac optimized for minimum ink usage. Together, the colors in the table may form a convex hull in a certain color space. Multiple color separation tables 10 may be generated for multiple different print systems 1. Thereafter the table 10 may be used by a printer operator or print system 1. Depending on its use, a color separation table 10 may be provided in any suitable manner.

Figure 4:
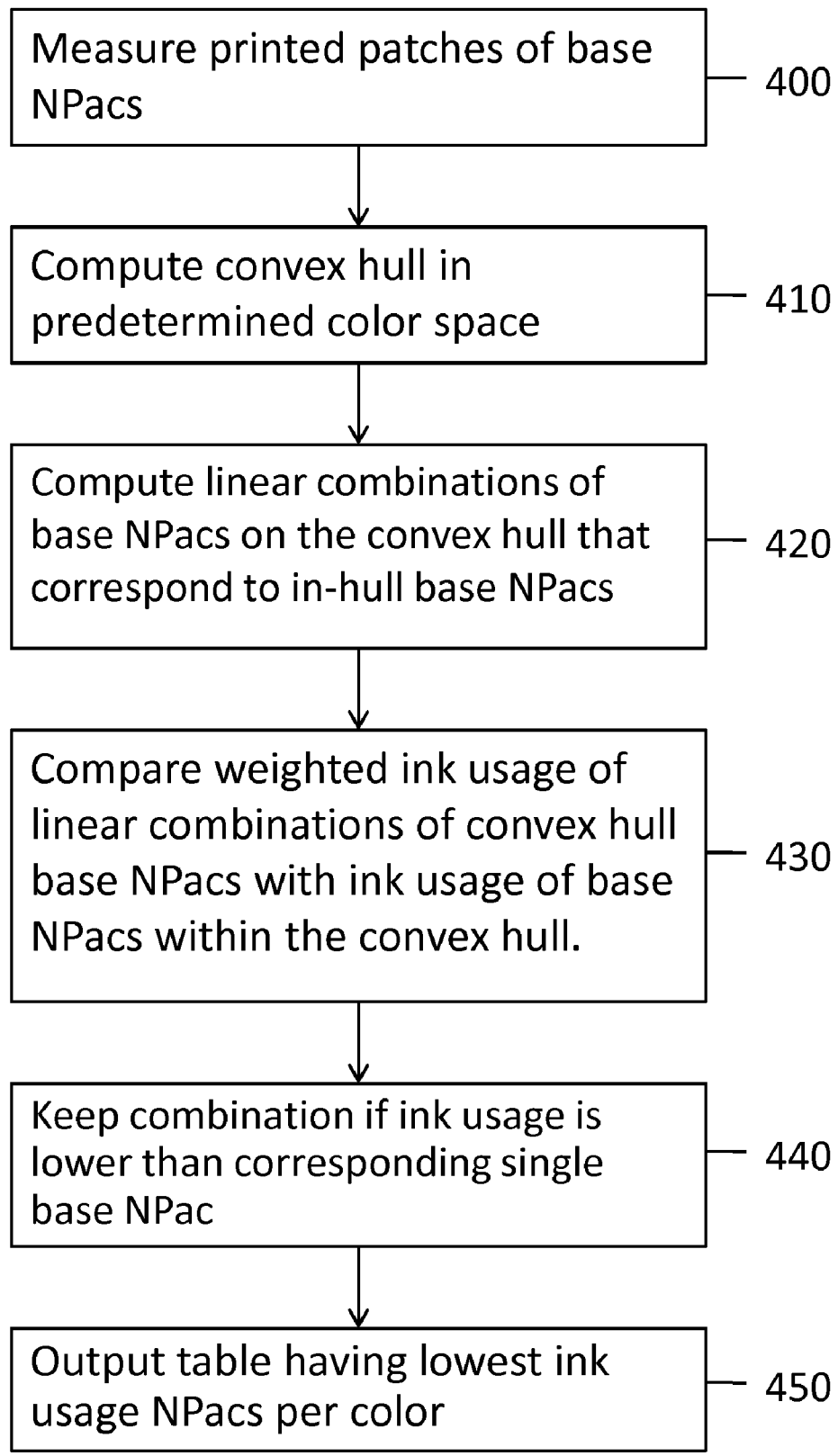
FIG. 4 shows a flow chart of a filtering method.

In FIG. 4, a method of filtering base NPacs is shown. A part of this method may refer to step 350 of FIG. 4. The method may limit the number of base NPacs for which linear combinations of its vertices are computed. The filtering method may prevent that for every base NPac linear combinations are calculated and therefore limit the amount of time needed to calculate optimized NPacs while maintaining an optimized result.

In step 400 the patches of the obtained base NPacs are measured. The NPacs may be obtained by a method similar to steps 300 to 330. The patches may be printed using halftoning, as explained above. The patches may be measured.

In step 410, a convex hull of the measurements may be computed, in a certain color space. The computation may comprise computing which NPacs form the convex hull in a certain color space. For example, the convex hull may be computed in the CIE XYZ space, or a transformation of the CIE XYZ space that results in a more accurate printer model, such as, but not limited to a Yule-Nielsen n-exponent transformation to $XYZ^n$.

In a further step 420, linear combinations of base NPacs on the convex hull are computed that correspond to the same color as respective base NPacs within the convex hull. Base NPacs on the convex hull are used that form the vertices of polyhedra of respective base NPacs within the convex hull, and correspond to the same color as the respective base NPac within the convex hull. The barycentric coordinates of the vertices correspond to the weights of each of the combined base NPacs. The total ink usage may be calculated by adding up each weighted ink usage.

Using merely convex hull base NPacs for computing linear combinations filters out computation of many other possible linear combinations of base NPacs within the convex hull. This saves computer memory usage as well as computing time. By going through the base NPacs that form the convex hull, i.e. the outer 'shell' of the convex hull, to form the linear combinations, no color gamut will be lost in this step.

In step 430, the combined, weighted ink usage of each of the linear combinations may be compared with the ink usage of its corresponding base NPac within the hull. In step 440, the linear combinations may be kept if the weighted ink usage is less than the ink usage of the corresponding base NPac within the convex hull. Vice versa, the base NPac within the convex hull may be kept if its ink usage is lower than that of the corresponding linear combination.

In step 450, a color separation table may be generated, wherein an optimized NPac is assigned to each color on the convex hull, in a certain color space.

In the above, reference is made to minimized ink usage. However above methods may also be applied for other print attributes, such as, but not limited to, grain and/or color constancy, wherein the NPacs may be optimized according to those other print attributes.

In one aspect, a method of optimizing a print attribute value may comprise first determining a print attribute value range and a reference print attribute value. For example, the print attribute may be ink usage, the reference print attribute value may be 0, corresponding to an ink usage as low as possible, and the print attribute range may be between 0 and 40 nanograms per pixel, and/or between 0 and 5 inks per halftone pixel. In the optimization method, it may be the aim to reach the reference print attribute value as close as possible. The reference print attribute value may comprise a minimum or maximum value, defining a limit of the print attribute range, but it may also be somewhere between the ends of the print attribute range, for example approximately in the middle of the range. The value may comprise a grain value or a color constancy value.

Then, base NPacs may be selected that have print attribute values in the print attribute value range. NPacs that fall outside of the range may be disregarded. A possible method is selecting NPs based on the respective at least one print attribute, and/or mapping NPacs on the ink limit, as explained above.

Patches of the base NPacs may be printed and measured, so as to be able to assign NPacs to a corresponding color in a color space.

Linear combinations of the base NPacs may be computed, and one of (i) the base NPac or (ii) the linear combination of base NPacs may be assigned to the corresponding color, by verifying which of (i) the base NPac and (ii) the linear combination of base NPacs is closest to the reference print attribute value. For example, if a linear combination of base NPacs has more color constancy, less grain, or uses less ink, than a single base NPac having the same color, the linear combination of base NPacs may replace the single base NPac.

Computing the linear combinations of the base NPacs may be advantageously expedited by incorporating a filtering method. The convex hull of the colors may be computed in a predetermined color space after having measured the patches.

A weighted print attribute value of linear combinations of the base NPacs that are situated on the convex hull may be compared to the print attribute value of the corresponding single base NPac inside the convex hull, wherein the linear combination of base NPacs and the corresponding single base NPacs have the same color. Computing linear combinations of other base NPacs, i.e. NPacs that are not on the convex hull, may be left out this computing step, saving significant computing time. Some of the single base NPacs inside the convex hull may be kept if they have a print attribute value that is closer to the reference print attribute value than the weighted print attribute value of the respective corresponding linear combinations of base NPacs on the convex hull. If the weighted print attribute value of the linear combination of NPacs is closer to the reference print attribute value than the print attribute value of the corresponding base NPac, than the combination may be kept.

In a further aspect, a computer program product may be provided that may comprise (i) a color separation table 10 containing NPacs associated to a minimum ink usage for a given print system 1 and color values corresponding to each of the NPacs, (ii) instructions, that when executed on a processing circuit 6 instruct a processing circuit to perform a method comprising: (a) deriving one or more input color values from an image, (b) selecting one or more NPacs from the table 10 corresponding to the one or more input color values, and (c) communicating the one or more NPacs to a halftoning process.

The computer program product may comprise, but is not limited to, software, drivers, and/or data saved on a storage device or data carrier.

Accordingly, a method of facilitating low ink usage for a color may be provided, which may comprise (i) providing a table 10 containing NPacs associated to a minimum ink usage for a given print system 1, and color values corresponding to each of the NPacs, (ii) deriving one or more input color values from an image, (iii) selecting one or more NPacs from the table 10 corresponding to the one or more input color values, and (iv) communicating the one or more NPacs to a halftoning process.

According to an additional aspect, a print system 1 may be provided, that may comprise (i) a storage device 7 storing a table with NPacs corresponding to predetermined color values available on the print system 1, the NPacs being optimized for low ink usage, and (ii) a processing circuit arranged to communicate the NPacs in the table to a halftoning process.

As will be understood by the skilled person, in the above description and in the claims, the term "optimizing" should be understood as an act of improving or trying to reach an optimal by performing certain steps. It should not be understood as an act of reaching a certain undisputable optimal solution.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

What is claimed is:

1. Method of optimizing print color according to a print attribute value, comprising
    determining a print attribute value range pertaining to a reference print attribute value,
    selecting base NP (Neugebauer Primary) area coverages, comprising area coverages of single NPs and combined NPs, having print attribute values in the print attribute value range,
    printing and measuring patches corresponding to the base NP area coverages,
    computing linear combinations of the base NP area coverages, and
    assigning one of the base NP area coverage or the linear combination of base NP area coverages to the corresponding color, depending on which is closest to the reference print attribute value.

2. Method according to claim 1, the computing of linear combinations of the base NP area coverages comprising the following filtering method:
   computing the convex hull of the colors of the patches in a predetermined color space,
   determine the NP area coverages corresponding to the colors forming the convex hull,
   comparing a weighted print attribute value of a linear combination of base NP area coverages on the convex hull to a print attribute value of a base NP area coverage inside the convex hull having a corresponding color; and
   keeping the base NP area coverage inside the convex hull only if it has a print attribute value that is closer to the reference print attribute value than the weighted print attribute value of the linear combination of base NP area coverages on the convex hull.

3. Method according to claim 1, comprising generating a color separation table mapping colors to NP area coverages assigned to those colors, the respective NP area coverages being base NP area coverages or linear combinations of base NP area coverages.

4. Method according to claim 1, wherein
   the print attribute comprises ink usage,
   the reference print attribute value is 0, and
   the print attribute value range ranges from 0 to a maximum amount of ink usage.

5. Method according to claim 1, wherein the print attribute comprises a number of different inks, and NPs are selected that do not exceed a maximum number of inks.

6. Method according to claim 1, wherein the print attribute comprises maximum amount of ink per halftone pixel, and NPs are selected of which the ink usage does not exceed a maximum amount of ink per halftone pixel.

7. Method according to claim 1, wherein the selecting of base NP area coverages comprises sampling the ink limit by computing at least one NP area coverage that uses a maximum amount of ink by linearly combining a non-selected NP outside of the ink limit with a selected NP.

8. Method according to claim 1, comprising
   after selecting the base NP area coverages, print said color patches by using device state error diffusion halftoning,
   measure the printed colors, and
   compute the convex hull of the measurements in a predetermined color space.

9. Method according to claim 3, comprising
   performing a color separation process;
   performing a halftoning process;
   communicating one or more NP area coverages (NPs) that were assigned to a corresponding color from the color separation process to the halftoning process; and
   printing a hard copy.

10. Method according to claim 3, wherein the color separation table corresponds to a predetermined print system.

11. Method according to claim 10, comprising
   computing the convex hull for different print system,
   generating a color separation table for each print system.

12. Computer program product, comprising
   a color separation table containing NP area coverages associated to a minimum ink usage for a given print system and color values corresponding to each of the NP area coverages, and
   instructions, that when executed on a processing circuit instruct a processing circuit to perform a method comprising:
   deriving one or more input color values from an image,
   selecting one or more NP area coverages from the table corresponding to the one or more input color values, and
   communicating the one or more NP area coverages to a halftoning process.

13. Method of facilitating optimized ink usage for a color, comprising
   providing a table containing NP area coverages associated to a minimum ink usage for a given print system, and color values corresponding to each of the NP area coverages,
   deriving one or more input color values from an image,
   selecting one or more NP area coverages from the table corresponding to the one or more input color values, and
   communicating the one or more NP area coverages to a halftoning process.

14. Print system, comprising
   a storage device having stored thereon a table with NP area coverages corresponding to predetermined color values available on the print system, the NP area coverages being optimized for ink usage, and
   a processing circuit arranged to communicate the NP area coverages in the table to a halftoning process.

15. A method comprising:
   selecting from a full set of Neugebauer Primary area coverages (NPacs) a base set of base NPacs, said selecting being based on a criterion relating to a print attribute, said base set excluding non-base NPacs of said full set not meeting said criterion;
   printing and measuring patches corresponding to each of said base NPacs, said measuring yielding measurements; and
   generating a lookup table assigning colors to respective ones of said base NPacs, said lookup table not assigning colors to any of said non-base NPacs.

16. A method as recited in claim 15 wherein said attribute is selected from a set consisting of ink amounts required to print an NPac, color constancy, and grain.

17. A system comprising non-transitory storage media encoded with code to, when executed by hardware, implement the method of claim 15.

* * * * *